United States Patent [19]

Warner et al.

[11] Patent Number: 5,129,482
[45] Date of Patent: Jul. 14, 1992

[54] CLOSED LUBRICATION SYSTEM FOR BEARINGS

[75] Inventors: Dale J. Warner, Palm Harbor; Dale J. Warner, Safety Harbor, both of Fla.

[73] Assignee: A.W. Chesterton Company, Stoneham, Mass.

[21] Appl. No.: 582,392

[22] Filed: Sep. 13, 1990

[51] Int. Cl.$^5$ .......................... F01M 5/00; F01P 11/08
[52] U.S. Cl. .................................. 184/104.3; 184/6.4; 184/108
[58] Field of Search .............. 184/6.1, 6.4, 108, 103.1, 184/104.1, 104.3, 6.26, 55.1; 137/207, 251.1, 254; 384/473, 467, 476, 471

[56] References Cited

U.S. PATENT DOCUMENTS

| | | | |
|---|---|---|---|
| 2,072,294 | 3/1937 | Clemons | 137/251.1 |
| 2,979,161 | 4/1961 | Lyden | 184/103.1 |
| 3,003,834 | 10/1961 | Pendleton . | |
| 3,149,883 | 9/1964 | Reilly . | |
| 3,169,809 | 2/1965 | Pendleton . | |
| 3,590,857 | 7/1971 | Gruett | 184/103.1 |
| 3,642,327 | 2/1972 | Walther . | |
| 4,067,351 | 1/1978 | Causey | 137/254 |
| 4,434,988 | 3/1984 | Warner . | |

*Primary Examiner*—Ira S. Lazarus
*Assistant Examiner*—Alan B. Cariaso
*Attorney, Agent, or Firm*—Hill, Van Santen, Steadman & Simpson

[57] ABSTRACT

A closed lubrication system for use in bearing housings subject to a range of temperatures which isolates the air and lubricant within the bearing housing from potential contamination arising from exposure to ambient air. The invention includes a liquid-displacement expansion chamber assembly which is responsive to temperature changes in the bearing housing to accommodate volumetric expansion and contraction of supply air. A constant level lubricator is provided to maintain the quantity of lubricant at a constant sump level. A lubricant circulation assembly, including a lubricant filter, a lubricant cooler, a lubricant pump, and a sight gauge is also provided. The lubricant circulation assembly and the constant level oiler may form part of the self-contained, integral unit adapted to be selectively connected to the bearing housing. The lubricant pump may be a gear pump. The liquid-displacement expansion chamber assembly includes first chamber open to supply air and isolated from contact with ambient air, and a second chamber open to ambient air, but isolated from contact with supply air. In one embodiment, the first chamber is disposed generally below the second chamber. In a second embodiment, the first chamber is disposed generally laterally of the second chamber.

20 Claims, 3 Drawing Sheets

CLOSED LUBRICATION SYSTEM FOR BEARINGS

TECHNICAL FIELD

The invention relates to a closed lubrication system for use in bearing housings. Specifically, the invention relates to a closed lubrication system for preventing potential contamination of lubricant through contact with the ambient atmosphere.

BACKGROUND OF THE INVENTION

Rotary shafts of rotary pumps and other devices are usually supported for rotation using bearings. Most of these bearings fail long before their theoretical design life is over. It has been found that the major reasons for such premature bearing failures are loss of oil and oil contamination.

Oil contamination may occur from several sources. First, during each start and stop cycle the bearing housing admits a substantial amount of exterior air. The bearing housing of a typical pump with a 1.875" diameter shaft is designed to operate at 185° F. As the pump is actuated and brought to operating temperature, the air within the bearing housing expands to such a degree that approximately 27.5 cubic inches of air will be expelled. Upon shutdown, the bearing housing cools, drawing in an equivalent amount of exterior air. This air is often highly saturated with moisture, and may be further contaminated with ambient particles or with fumes from various industrial processes.

Second, whenever the pump is shut down and exposed to temperatures near the dew point, moisture in the air condenses on the walls of the pump and eventually mixes with the oil or other lubricant. Oil will dissolve up to 0.5% of water by volume, with additional water settling to the bottom of the sump. Various additives in commercial oils (such as emulsifiers) will increase the amount of dissolved water. Once trapped by the oil, the water can not evaporate when the pump is reheated. Furthermore, the metals used in most bearing housings effectively make them into radiators which will cause moisture condensation within the pump even when the ambient air has not reached its dew point.

Finally, since the bearing housing is an isolated lubrication system, any foreign material that enters the bearing housing tends to accumulate in the oil. Such contaminants may include water, metal fines, or pumped fluid migrating down the shaft. These contaminants do repeated damage to the bearings over time. As the quantity of contaminants builds up, the rate of bearing damage accelerates.

Various studies have indicated that very small quantities of water present in the lubricant will cause rapid deterioration of the bearing and premature bearing failure. This is further compounded by vapors dissolving into the oil, particularly corrosive vapors.

In analyzing bearing failures and after conducting extensive research into various theories of bearing failure, applicant has concluded that the best way to extend bearing life is to provide a clean, filtered source of oil for lubrication, and to environmentally protect the bearings from the introduction of moisture, fumes, and other contaminants.

Various devices are currently known for either isolating a lubrication system from its ambient environment, or for purifying lubricant to rid it of contaminants that may have entered the system. Among these devices are bearing isolators, oil purification systems, and mist lubrication systems.

Bearing isolators or "labyrinths" are intended to overcome the short life of so-called "lip seals". Bearing isolators retain oil within the bearing housing, and prevent gross introduction of moisture, dirt, and other contaminants through the shaft opening. Bearing isolators do not effectively address the problem of moisture and fume contamination, nor do they provide any oil filtration. In fact, there are indications that bearing isolators may actually increase moisture contamination by providing an open passage to allow free flow of potentially contaminated air into and out of the bearing housing.

Oil purification systems are relatively complex, and involve the following steps:

1. Draining the oil from the bearing housing at predetermined intervals;
2. Filtering the oil to remove solids;
3. Heating the oil to a high temperature in a near-vacuum, and dropping the oil onto a spinning disk to remove dissolved water; and
4. Returning the oil to the bearing housing.

Oil purification systems require a significant capital investment which can be justified only in large facilities with many pumps. Oil filtration lowers the average level of contaminants, but does so only *after* the contaminants have entered the bearing housing.

Oil mist systems employ nozzles or other apparatus to atomize the oil, thus removing dissolved water from the oil. Although several theories have been advanced to account for increased bearing life attained with oil mist systems, the major advantages appear to be that a constant supply of clean oil is introduced into the bearing housing, and that positive pressure is introduced into the bearing housing, thus preventing the introduction of potentially contaminated ambient air during periods of shutdown.

Oil mist systems generate a significant degree of oil vapors, which must be vented to the outside atmosphere. This not only restricts the oil mist systems to outdoor use, but has prompted the Environmental Protection Agency to target oil mist systems as a pollution source that should be eliminated, as soon as a viable alternative technology is available.

It is therefore apparent that the need exists for a bearing lubrication system that will provide a supply of lubricant that is free of moisture and other contaminants, and can be operated in an environmentally sound manner.

SUMMARY OF THE INVENTION

The present invention overcomes the disadvantages of known lubrication systems by isolating the air and lubricant within the bearing housing from potential contamination arising from exposure to ambient air. The invention includes an liquid-displacement expansion chamber assembly which is responsive to temperature changes in the bearing housing to accommodate volumetric expansion and contraction of supply air. A constant level lubricator is provided to maintain the quantity of lubricant at a constant sump level. A lubricant circulation assembly, including a lubricant filter, a lubricant cooler, a lubricant pump, and a sight gauge is also provided.

The lubricant circulation assembly and the constant level oiler may form part of a self-contained, integral unit adapted to be selectively connected to the bearing housing. The lubricant pump may be provided as a gear pump, and the filter should remove solids from the lubricant down to a size of approximately 2 microns.

The sight gauge may be provided as a transparent tube through which lubricant flows during operation of the circulation system. The tube has an inlet end including a ball seating, an outlet end including a spring abutment, and a predetermined inner diameter. The sight gauge includes a ball having an outer diameter slightly smaller than the inner diameter of the tube. The ball is disposed in the tube between the ball seating and the spring abutment, and a spring is provided between the ball and the spring abutment to bias the ball towards the ball seating. When oil is flowing through the system the ball is lifted from the seating, and can be readily seen through the transparent tube.

The constant level lubricator includes a main reservoir open to the sump level of lubricant and to supply air, but isolated from ambient air. A secondary reservoir, containing only lubricant, is disposed generally above the main reservoir, and a lubricant passage extends from the secondary reservoir into the primary reservoir to a point substantially below sump level. The constant level lubricator maintains the level of lubricant despite inevitable slight losses due to leakage.

The liquid-displacement expansion chamber assembly includes a first chamber open to supply air and isolated from contact with ambient air, and a second chamber open to ambient air but isolated from contact with supply air. In one embodiment, the first chamber is disposed generally below the second chamber, and the first chamber is filled to a predetermined initial level with an isolation liquid, usually lubricant. A first passage extends downwardly from the second chamber into the first chamber to a point substantially below the fill level of lubricant. A second passage, in communication with supply air in the bearing housing, extends upwardly in the first chamber to a point substantially above the fill level of isolation liquid.

In another embodiment, the first chamber is disposed generally laterally of the second chamber, and includes a top end having a port open to supply air. The second chamber includes a top having a port open to ambient air. The chambers are connected together with an isolation liquid passage between the bottom ends of the chambers, and the chambers are filled to a predetermined initial level with isolation liquid.

Other objects and advantages of the present invention will become apparent upon reference to the accompanying description when taken in conjunction with the following drawings.

DESCRIPTION OF THE PREFERRED EMBODIMENT

Figure 1:
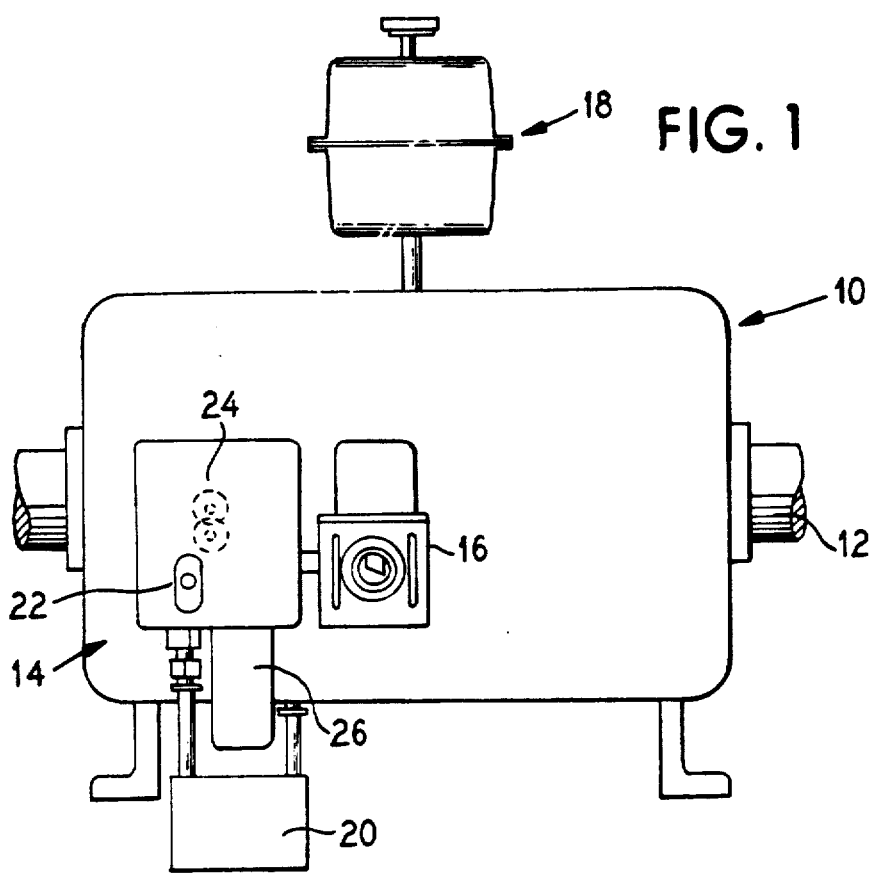
FIG. 1 is a side view of a bearing housing incorporating a lubrication circulation system according to the present invention.

FIG. 1 shows a bearing housing assembly 10 surrounding a shaft 12. The closed lubrication system of the present invention includes a lubricant circulation assembly 14, a constant level lubricator 16, and an liquid-displacement expansion chamber assembly 18. The lubricant circulation assembly 14 includes a lubricant cooler 20, a sight gauge 22, a lubricant pump 24, and a lubricant filter 26. As shown schematically in FIG. 2, a bearing housing 28 defines a chamber 30. The chamber 30 includes a lubricant sump 32 in which lubricant 34 is maintained at a predetermined lubricant sump level 36. A predetermined quantity of supply air 38 occupies the remaining space in the chamber 30 above the sump level 36. The shaft 12 passes through the bearing housing 28, and is supported at opposite ends of the housing 28 by a pair of bearings 42. Face seals 40 are provided at each end of the bearing housing 28 in order to prevent fluid communication between the chamber 30 and the atmosphere surrounding the bearing housing 28. The face seals 42 may be of the type disclosed in U.S. Pat. No. 4,434,988, or of other suitable design.

Figure 4:
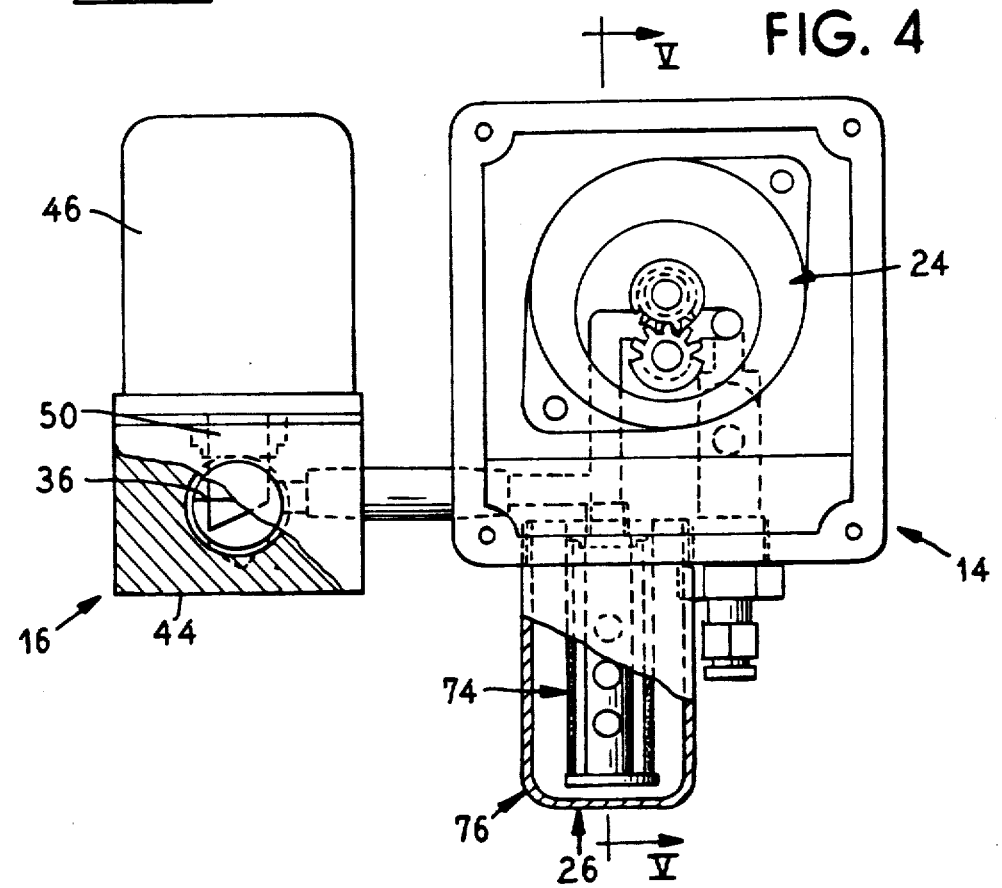
FIG. 4 is a sectional view of a lubricant circulation and lubricant level unit.
Figure 2:
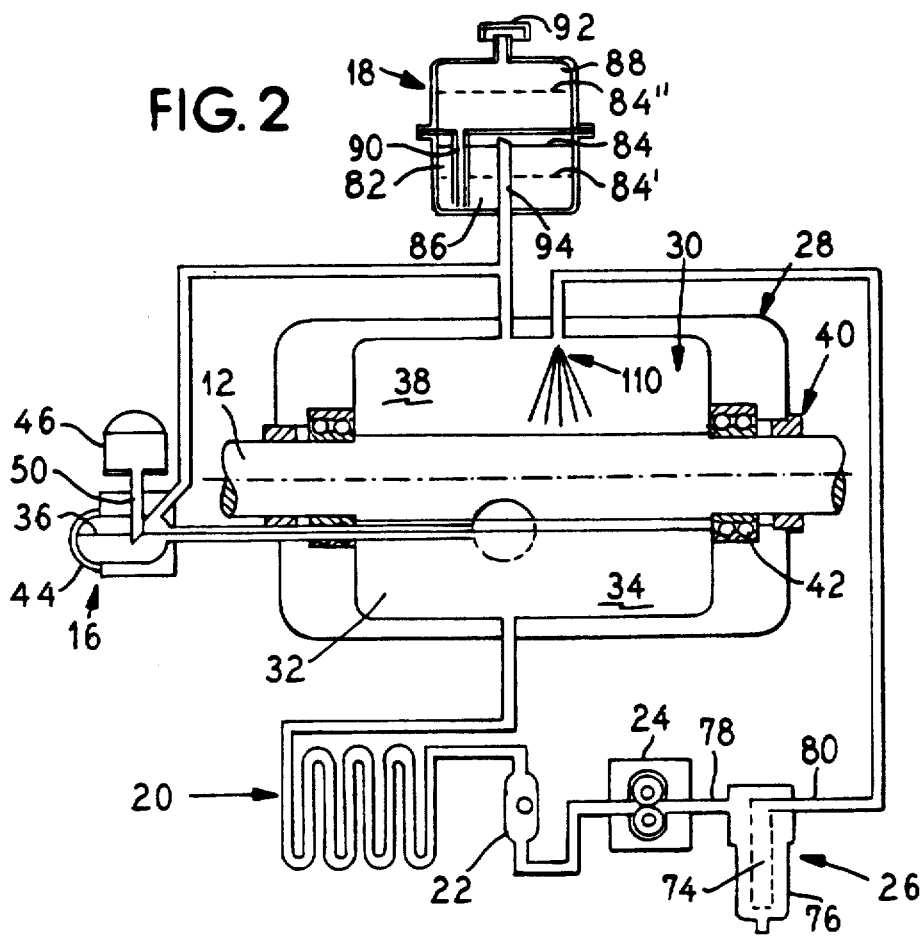
FIG. 2 is a schematic diagram of the FIG. 1 embodiment.
Figure 3:
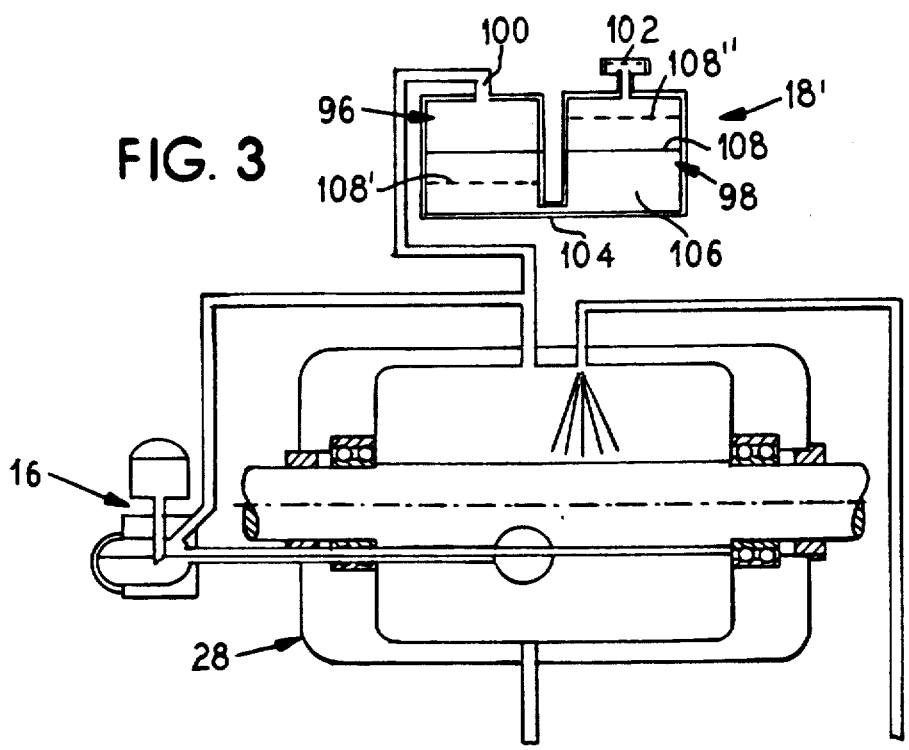
FIG. 3 is a schematic diagram of another embodiment.

The lubrication circulation assembly 14 includes a constant level lubricator 16, best seen in FIGS. 2 through 4. The constant level lubricator includes a main reservoir 44 that is open to the sump level 36 and to the supply air 38. A secondary reservoir 46 is disposed generally above the main reservoir 44, and is filled with lubricant to a predetermined level 48. A lubricant passage 50 extends from the secondary reservoir and into the main reservoir to a point substantially below the sump level 36. The constant level lubricator 16 maintains the lubricant 32 at the sump level 36, Which insures at least partial immersion of the bearings 42 in the lubricant 32, despite the gradual loss of lubricant due to inevitable leakage in the system over time.

The lubricant circulation assembly 14 may also include a cooler 20, which may be a standard coil-type or radial fin cooler.

Figure 5:
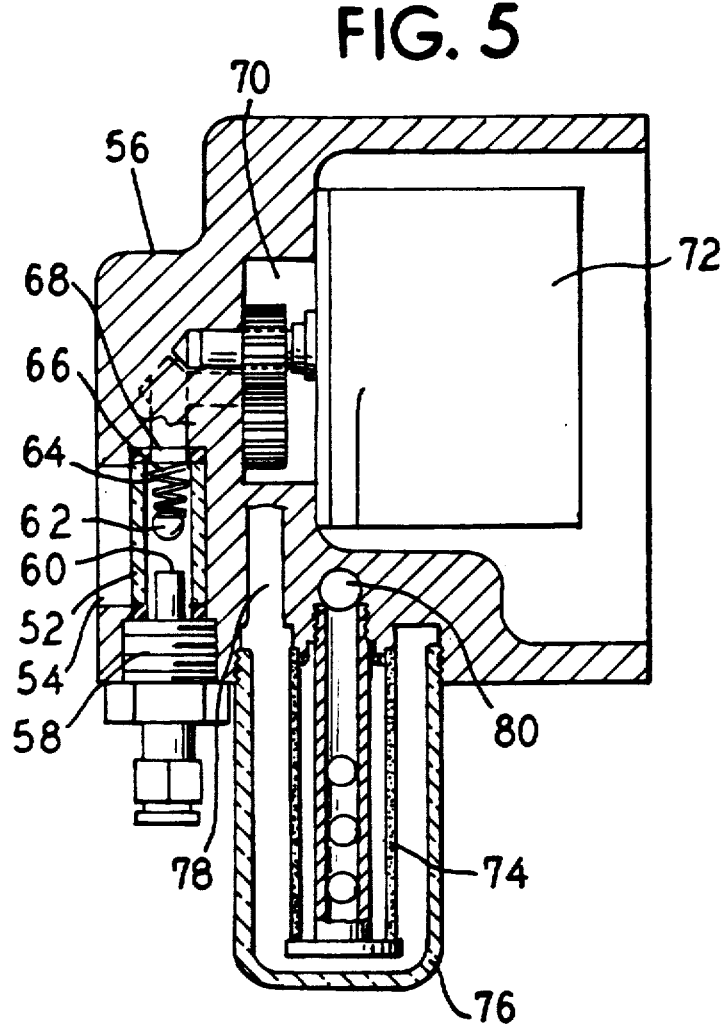
FIG. 5 is a sectional view taken along lines V—V of FIG. 4.

The lubrication circulation assembly 14 also includes a sight gauge 22, best seen in FIGS. 2 and 5. The sight gauge 22 includes a transparent tube 52 that is visible through an opening 54 in the lubricant circulation assembly housing 56. The sight gauge includes a threaded inlet fitting 58 from which extends a ball seating 60. A ball 62 is biased toward the ball seating 60 by a spring 64 that rests against a spring abutment 66 at an outlet end 68 of the transparent tube 52.

The lubricant circulation assembly 14 also includes a lubricant pump 24. The pump 24 is shown as a gear pump with gears 70 being actuated by a motor 72, although it is also contemplated that other forms of pumps, for example vane pumps, could also be employed.

A lubricant filter 26 forms a part of the lubricant circulation assembly 14, and is best seen in FIGS. 2, 4, and 5. The filter 26 includes a replaceable filter insert 74 surrounded by a casing 76 which may be transparent. The filter insert 74 is provided so that particles down to approximately 2 microns may be removed from lubricant passing through the inlet 76, through the insert 74, and exiting through the outlet 80.

Two different embodiments of the liquid-displacement expansion chamber assembly can be seen in FIGS. 2 and 3. In the FIG. 2 embodiment, the liquid-displacement expansion chamber assembly 18 includes a first chamber 82 filled to a predetermined initial fluid level 84 with an isolation liquid 86 (for example, oil or other lubricant). A second chamber 88 is disposed generally above the first chamber 82, and is in fluid communication with the first chamber 82 through a first passage 90, which extends substantially below the fluid level 84. The second chamber 88 is open to ambient air through a top mounted port 92. The first chamber 82 is open to supply air 38 through a second passage 94 extending from the bearing housing chamber 30 and through the chamber 82 to a level substantially above the fluid level 84.

In the embodiment shown in FIG. 3, the liquid-displacement expansion chamber assembly 18' includes a first chamber 96 that is disposed generally laterally of a second chamber 98. The first chamber is open to supply air through a port 100, and the second chamber is open to ambient air through a port 102. The first chamber is in fluid communication with the second chamber through an isolation liquid passage 104, and the chambers are filled with isolation liquid 106 to a predetermined initial level 108.

In operation, the rotary shaft device (not shown) may be actuated simultaneously with the lubricant circulation assembly 14. The gear pump 24 draws fluid from the sump 32 through the cooler 20, the sight gauge 22, and the filter 26. Lubricant from the circulation assembly 14 may be returned to the bearing housing chamber 30 in the form of a spray 110. The constant level lubricator 16 ensures that the sump level 36 remains constant.

As the shaft 12 rotates, the temperature inside the bearing housing 28 increases, causing volumetric expansion of the supply air 38. This expansion is accommodated by the respective expansion chamber assemblies 18, 18'.

With reference to the expansion chamber 18 shown in FIG. 2, expansion of the supply air 38 forces isolation liquid 86 in the first chamber 82 to be displaced through the passage 90 and into the second chamber 88. This displacement will cause the isolation liquid in the first chamber 82 to drop to an expanded level 84', while the second chamber 88 is filled to a level 84". After operation of the rotary shaft device, the bearing housing 28 gradually cools, and the isolation liquid 86 returns to its initial level 84.

As the supply air expands, isolation liquid 106 is displaced from the first chamber 96 into the second chamber 98 to fluid levels shown at 108', 108". Again, as the bearing housing cools down after operation of the rotary shaft device, the isolation liquid returns to its initial equilibrium level 108.

The liquid-displacement expansion chamber assembly 18, 18' protects the supply air 38 and the lubricant 32 from potential contamination due to contact with the ambient air by permitting isolated volumetric expansion of the supply air 38. The supply air 38 is thus maintained at a relatively constant pressure irrespective of variations of temperature within the bearing housing chamber 30. The circulation assembly 14 serves to augment the protection afforded by isolation of the lubricant by removing substantially all of the contaminants that may be introduced by bearing wear, slight leakages in the system, or other minor contaminant sources.

As can be seen in FIGS. 1 and 4-6, the circulation assembly 14 is provided as an integral unit which may be easily installed during assembly of the bearing housing or may be easily retrofitted in existing devices.

The invention minimizes pressure differences between the bearing housing and the outside environment to less than a 3" column of water. Thus, the bearing housing pressure is never sufficient to cause transportation of contaminants across the gaskets or seals.

Provision of positive face type shaft seals at the opposite ends of the bearing housing eliminates the use of O-rings, gaskets, or other mounting devices used in labyrinth type seals. This eliminates any potential leakage caused by deterioration of elastomeric materials.

Although the present invention has been described with reference to a specific embodiment, those of skill in the art will recognize that changes may be made thereto without departing from the scope and spirit of the invention as set forth in the appended claims.

I claim as my invention:

1. A closed lubrication system for use in bearing housings subject to a range of temperatures, said lubrication system comprising the following:
    isolation means for enclosing supply air and lubricant within said bearing housing;
    liquid-displacement expansion means for preventing contamination of said lubricant and said supply air from contact with ambient air while maintaining said supply air at a relatively constant pressure throughout said range of temperatures; and
    lubricant circulation means for circulating said lubricant.

2. A closed lubrication system according to claim 1, wherein said lubricant circulation means comprises the following:
    a lubricant filter;
    a lubricant cooler;
    a sight gauge; and
    a lubricant pump adapted to circulate lubricant from said bearing housing, through said lubricant filter, said lubricant cooler, and said sight gauge, and back to said bearing housing.

3. A closed lubrication system according to claim 2, further comprising level means, open to said supply air, for maintaining a relatively constant sump level of lubricant in said housing.

4. A closed lubrication system according to claim 3, wherein said lubricant circulation means and said level means form part of a self-contained, integral unit adapted to be selectively operatively connected to said bearing housing.

5. A closed lubrication system according to claim 4, wherein said lubricant pump comprises a gear pump.

6. A closed lubrication system according to claim 2, wherein said filter removes solids from said lubricant down to approximately 2 microns.

7. A closed lubrication system according to claim 2, wherein said sight gauge comprises the following:
    a transparent tube through which lubricant flows during operation of said circulation system said tube having an inlet end including a ball seating, an outlet end including a spring abutment, and a predetermined inner diameter;
    a ball having an outer diameter slightly smaller than said inner diameter of said tube and disposed in said tube between said ball seating and said spring abutment; and
    a spring means, disposed between said ball and said spring abutment, for biasing said ball toward said ball seating.

8. A closed lubrication system according to claim 4, wherein said level means comprises the following:

a main reservoir open to said sump level of lubricant and to said supply air but isolated from said ambient air;

a secondary reservoir disposed generally above said main reservoir; and a lubricant passage extending from said secondary reservoir and into said main reservoir to a point substantially below said sump level.

9. A closed lubrication system according to claim 1, wherein said liquid-displacement expansion means comprises the following:

a first chamber open to said supply air and isolated from contact with said ambient air by a liquid;

a second chamber open to said ambient air and isolated from contact with said supply air by said liquid; and passage means for providing a communication passage for said liquid between said chambers and allowing expansion of said supply air.

10. A closed lubrication system according to claim 9, wherein said first chamber is disposed generally below said second chamber, said first chamber is filled to a predetermined level with an isolation liquid, and said passage means comprises the following:

a first open passage extending downwardly from said second chamber into said first chamber to a point substantially below said predetermined level; and a second open passage in communication with said supply air and extending upwardly in said first chamber to a point substantially above said predetermined level.

11. A closed lubrication system according to claim 9, wherein:

said first chamber is disposed generally laterally of said second chamber and includes a top end and a bottom end, said top end of said first chamber having a port open to said supply air;

said second chamber includes a top end and a bottom end, said top end of said second chamber having a port open to said ambient air;

said chambers are filled to a predetermined level with an isolation liquid; and said liquid-displacement expansion means further comprises isolation liquid passage means, between the respective bottom ends of said chambers, for permitting transfer of isolation liquid between said chambers.

12. A closed lubrication system according to claim 1, wherein said isolation means comprises a pair of face seals surrounding a rotary shaft at opposite ends of said housing.

13. In a bearing housing assembly defining a chamber enclosing a predetermined quantity of lubricant and supply air, a closed lubrication system comprising the following:

a constant level lubricator open to said lubricant and said supply air and adapted to maintain said quantity of lubricant at a constant sump level;

a lubricant circulation assembly including a lubricant filter, a lubricant cooler, a lubricant pump, and a sight gauge, said lubricant pump being actuable to conduct lubricant from said chamber, through said filter, and back to said chamber; and a liquid-displacement expansion chamber assembly responsive to temperature changes in said chamber to accommodate volumetric expansion and contraction of said supply air.

14. A method of lubricating bearings in a bearing housing including a chamber enclosing lubricant, supply air, and said bearings, said method including the following steps:

sealing said chamber to prevent contact between said supply air and ambient air;

maintaining said lubricant in said chamber at a sump level ensuring at least partial immersion of said bearings in said lubricant;

providing a liquid-displacement expansion assembly including a first chamber open to said supply air and isolated from contact with said ambient air by a liquid, a second chamber open to said ambient air and isolated from contact with said supply air by a liquid, and passage means for providing communication for said liquid between said chambers and allowing expansion of said supply air; and permitting said supply air to expand into said liquid-displacement expansion assembly, thus maintaining said supply air at a relatively constant pressure irrespective of variations of temperature within said chamber.

15. A method according to claim 14, further including the step of circulating said lubricant from said chamber, through a filter, and back to said chamber.

16. A method according to claim 15, wherein said step of circulating further comprises passing said lubricant through a lubricant cooler.

17. A method according to claim 16, wherein said step of circulating further comprises passing said lubricant through a sight gauge.

18. A method according to claim 14, wherein said step of maintaining said supply air comprises permitting expansion of said supply air to displace a predetermined quantity of isolation liquid from an initial level.

19. A method according to claim 18, wherein said step of maintaining said supply air further comprises permitting said isolation liquid, upon contraction of said supply air, to return to said initial level.

20. In a bearing housing assembly defining a chamber enclosing a predetermined quantity of lubricant and supply air, a closed lubrication system comprising the following:

a constant level lubricator open to said lubricant and said supply air and adapted to maintain said quantity of lubricant at a constant sump level;

a lubricant circulation assembly including a lubricant pump and at least one of a lubricant filter, a lubricant cooler, and a sight gauge, said lubricant pump being actuable to conduct lubricant from said chamber, through said circulation assembly, and back to said chamber; and a liquid-displacement expansion chamber assembly responsive to temperature changes in said chamber to accommodate volumetric expansion and contraction of said supply air.

* * * * *